United States Patent
Brandes et al.

[11] Patent Number: 6,125,131
[45] Date of Patent: Sep. 26, 2000

[54] LASER SYSTEM UTILIZING SORBENT-BASED GAS STORAGE AND DELIVERY SYSTEM

[75] Inventors: George R. Brandes, Southbury; Glenn M. Tom, Milford; James V. McManus, Danbury, all of Conn.

[73] Assignee: Advanced Technology Materials, Inc., Danbury, Conn.

[21] Appl. No.: 09/080,895

[22] Filed: May 18, 1998

Related U.S. Application Data

[63] Continuation-in-part of application No. 08/809,019, filed as application No. PCT/US95/13040, Oct. 13, 1995, Pat. No. 5,935,305, and a continuation of application No. 08/322,224, Oct. 13, 1994, Pat. No. 5,518,528.
[60] Provisional application No. 60/046,687, May 16, 1997.
[51] Int. Cl.[7] .................................................. H01S 3/20
[52] U.S. Cl. ............................................................ 372/51
[58] Field of Search .......................... 372/39, 51, 55–60

[56] References Cited

U.S. PATENT DOCUMENTS

| | | | |
|---|---|---|---|
| 240,423 | 4/1881 | James ............................................. | 53/400 |
| 1,608,155 | 11/1926 | Barnebey ......................................... | 222/3 |
| 2,356,334 | 8/1944 | Maude et al. .............................. | 422/146 |
| 2,663,626 | 12/1953 | Spangler .................................... | 48/190 |
| 2,987,139 | 6/1961 | Bush .......................................... | 95/133 |
| 2,997,371 | 8/1961 | Wadsworth et al. ..................... | 423/293 |
| 3,006,153 | 10/1961 | Cook ........................................ | 62/46.3 |
| 3,116,132 | 12/1963 | Haller et al. ............................... | 95/104 |
| 3,144,200 | 8/1964 | Taylor et al. .............................. | 62/55.5 |
| 3,287,432 | 11/1966 | Sensel .......................................... | 95/95 |
| 3,648,194 | 3/1972 | Melikian et al. ....................... | 372/59 X |
| 3,675,392 | 7/1972 | Reighter ....................................... | 95/96 |
| 3,713,273 | 1/1973 | Coffee ........................................ | 95/143 |

(List continued on next page.)

FOREIGN PATENT DOCUMENTS

| | | |
|---|---|---|
| 1095796 | 12/1960 | Germany . |
| 2264512 | 3/1971 | Germany . |
| 3139-781 | 10/1981 | Germany . |
| 52-72373 | 12/1975 | Japan . |
| 63-88017 | 10/1986 | Japan . |
| 3-127606 | 10/1989 | Japan . |
| 1181692A | 11/1983 | U.S.S.R. . |
| 1544475A1 | 7/1987 | U.S.S.R. . |
| 1583151A1 | 5/1988 | U.S.S.R. . |

OTHER PUBLICATIONS

"Beaded Carbon UPS Solvent Recovery", *Chemical Engineering*, vol. 84, No. 18, pp. 39–40, Aug. 29, 1977.

*Primary Examiner*—John D. Lee
*Attorney, Agent, or Firm*—Steven J. Hultquist; Oliver A. M. Zitzmann; William A. Barrett

[57] ABSTRACT

A laser system utilizing a fluid as the excitatory medium for stimulated light emission, wherein the fluid is supplied from a sorbent-based fluid storage and dispensing system coupled in fluid-supplying relationship with the laser apparatus. The laser may be an excimer laser utilizing as the laser working fluid a rare gas halide compound such as fluorides and/or chlorides of krypton, xenon and argon, as well as fluorine and/or chlorine per se. The laser system may alternatively be a far infrared gas laser utilizing a gas such as $CO_2$, $N_2O$, $CD_3OD$, $CH_3OD$, $CH_3OH$, $CH_3NH_2$, $C_2H_2F_2$, $HCOOH$, $CD_3I$, $CH_3F$, and $C^{13}H_3F$. Laser systems of the present invention may be utilized in applications such as materials processing, measurement and inspection, reading, writing, and recording of information, holography, communications, displays, spectroscopy and analytical chemistry, remote sensing, surveying, marking, and alignment, surgical and medical applications, plasma diagnostics, laser weaponry, laser-induced nuclear fusion, isotope enrichment and atomic physics.

22 Claims, 3 Drawing Sheets

U.S. PATENT DOCUMENTS

| | | | |
|---|---|---|---|
| 3,719,026 | 3/1973 | Sand | 95/106 |
| 3,788,036 | 1/1974 | Lee et al. | 95/101 |
| 4,023,701 | 5/1977 | Dockery | 222/3 |
| 4,263,018 | 4/1981 | McCombs et al. | 95/19 |
| 4,343,770 | 8/1982 | Simons | 422/112 |
| 4,414,005 | 11/1983 | DeBiévre et al. | 95/127 |
| 4,578,256 | 3/1986 | Nishino et al. | 423/210 |
| 4,749,384 | 6/1988 | Nowobilski et al. | 55/27 |
| 4,761,395 | 8/1988 | Tom et al. | 502/401 |
| 4,815,092 | 3/1989 | Chartier | 372/59 |
| 4,881,958 | 11/1989 | Eckardt et al. | 55/179 |
| 5,051,117 | 9/1991 | Prigge et al. | 55/58 |
| 5,089,244 | 2/1992 | Parent et al. | 423/347 |
| 5,133,787 | 7/1992 | Diot et al. | 55/179 |
| 5,151,395 | 9/1992 | Tom | 502/67 |
| 5,199,267 | 4/1993 | Mitsui | 372/59 X |
| 5,202,096 | 4/1993 | Jain | 422/190 |
| 5,238,469 | 8/1993 | Briesacher et al. | 95/115 |
| 5,277,040 | 1/1994 | Mitsui | 372/59 X |
| 5,385,689 | 1/1995 | Tom et al. | 252/194 |
| 5,409,526 | 4/1995 | Zheng et al. | 96/132 |
| 5,417,742 | 5/1995 | Tamhankar et al. | 95/96 |
| 5,518,528 | 5/1996 | Tom et al. | 95/103 |
| 5,707,424 | 1/1998 | Tom et al. | 95/95 |

LASER SYSTEM UTILIZING SORBENT-BASED GAS STORAGE AND DELIVERY SYSTEM

CROSS-REFERENCE TO RELATED APPLICATION

This application is based on and claims priority of U.S. Provisional Patent Application No. 60/046,687 filed May 16, 1997 in the name of George R. Brandes for "Laser System Utilizing Sorbent-Based Gas Storage and Delivery System." This application is also a continuation-in-part and claims priority of U.S. patent application Ser. No. 08/809,019 filed Apr. 11, 1997 issued Aug. 10, 1999 as U.S. Pat. No. 5,935,305 for "System for Gaseous Compounds," which is a §371 application based on International Application No. PCT/US95/13040 filed Oct. 13, 1995 and which is a continuation of U.S. patent application Ser. No. 08/322,224 filed Oct. 13, 1994, issued May 21, 1996 as U.S. Pat. No. 5,518,528.

BACKGROUND OF THE INVENTION

1. Field of the Invention

This invention relates generally to storage and dispensing systems for the selective dispensing of fluids from a vessel in which the fluid component(s) are sorptively retained by a solid sorbent medium, and are desorptively released from the sorbent medium in the dispensing operation. More particularly, the present invention relates to a laser system utilizing such a storage and dispensing system for gas supply to the laser as the excited medium for generating laser output.

2. Description of the Related Art

In a wide variety of industrial processes and applications, there is a need for a reliable source of process fluid(s) which is compact, portable, and available to supply the fluid(s) on demand. Such processes and applications include semiconductor manufacturing, ion implantation, manufacture of flat panel displays, medical treatment, water treatment, emergency breathing equipment, welding operations, space-based applications involving delivery of liquids and gases, etc.

U.S. Pat. No. 4,744,221 issued May 17, 1988 to Karl O. Knollmueller discloses a method of storing and subsequently delivering arsine, by contacting arsine at a temperature of from about −30° C. to about +30° C. with a zeolite of pore size in the range of from about 5 to about 15 Angstroms to adsorb arsine on the zeolite, and then dispensing the arsine by heating the zeolite to an elevated temperature of up to about 175° C. for sufficient time to release the arsine from the zeolite material.

The method disclosed in the Knoilmueller patent is disadvantageous in that it requires the provision of heating means for the zeolite material, which must be constructed and arranged to heat the zeolite to sufficient temperature to desorb the previously sorbed arsine from the zeolite in the desired quantity.

The use of a heating jacket or other means exterior to the vessel holding the arsine-bearing zeolite is problematic in that the vessel typically has a significant heat capacity, and therefore introduces a significant lag time to the dispensing operation. Further, heating of arsine causes it to decompose, resulting in the formation of hydrogen gas, which introduces an explosive hazard into the process system. Additionally, such thermally-mediated decomposition of arsine effects substantial increase in gas pressure in the process system, which may be extremely disadvantageous from the standpoint of system life and operating efficiency.

The provision of interiorly disposed heating coil or other heating elements in the zeolite bed itself is problematic since it is difficult with such means to uniformly heat the zeolite bed to achieve the desired uniformity of arsine gas release.

The use of heated carrier gas streams passed through the bed of zeolite in its containment vessel may overcome the foregoing deficiencies, but the temperatures necessary to achieve the heated carrier gas desorption of arsine may be undesirably high or otherwise unsuitable for the end use of the arsine gas, so that cooling or other treatment is required to condition the dispensed gas for ultimate use.

U.S. Pat. No. 5,518,528 issued May 21, 1996 in the names of Glenn M. Tom and James V. McManus, describes a gas storage and dispensing system, for the storage and dispensing of gases, e.g., hydride gases, halide gases, organometallic Group V compounds, etc. which overcomes various disadvantages of the gas supply process disclosed in the Knollmueller patent.

The gas storage and dispensing system of the Tom et al. patent comprises an adsorption-desorption apparatus, for storage and dispensing of gases, including a storage and dispensing vessel holding a solid-phase physical sorbent, and arranged for selectively flowing gas into and out of the vessel. A sorbate gas is physically adsorbed on the sorbent. A dispensing assembly is coupled in gas flow communication with the storage and dispensing vessel, and provides, exteriorly of the vessel, a pressure below the vessel's interior pressure, to effect desorption of sorbate from the solid-phase physical sorbent medium, and flow of desorbed gas through the dispensing assembly. Heating means may be employed to augment the desorption process, but as mentioned above, heating entails various disadvantages for the sorption/desorption system, and it therefore is preferred to operate the Tom et al. system with the desorption being carried out at least partially by pressure differential-mediated release of the sorbate gas from the sorbent medium.

The storage and dispensing vessel of the Tom et al. patent embodies a substantial advance in the art, relative to the prior art use of high pressure gas cylinders. Conventional high pressure gas cylinders are susceptible to leakage from damaged or malfunctioning regulator assemblies, as well as to rupture and unwanted bulk release of gas from the cylinder if the internal gas pressure in the cylinder exceeds permissible limits. Such overpressure may for example derive from internal decomposition of the gas leading to rapid increasing interior gas pressure in the cylinder.

The gas storage and dispensing vessel of the Tom et al. patent thus reduces the pressure of stored sorbate gases by reversibly adsorbing them onto a carrier sorbent, e.g., a zeolite or activated carbon material.

In recent years, a wide variety of lasers has come into common use, and numerous types are under development. Examples of various laser systems include gas lasers, solid state lasers, semiconductor lasers, excimer lasers, far-infrared lasers, dye lasers, free-electron lasers, x-ray lasers, etc.

In various of such types of lasers, the excited medium for stimulated light emission is a gas or gas mixture. The gas medium may be a very costly component which, although small in volume, requires continuing replacement, due to its degradation in the use of the laser.

An example is the excimer laser, which utilizes a diatomic gas as the laser working fluid, e.g., rare gas halide compounds such as krypton fluoride, krypton chloride, xenon fluoride, xenon chloride, and argon fluoride, argon chloride, as well as fluorine or chlorine per se. The primary consumable in excimer lasers is the laser gas, and such gas typically represents a major component of the operating costs of the laser system.

Accordingly, it would be a significant advance in the art, and therefore is an object of the present invention, to provide a source of laser gas which is simply and efficiently employed to provide on-demand dispensing of the gas.

Other objects and advantages of the invention will be more fully apparent from the ensuing disclosure.

SUMMARY OF THE INVENTION

This invention relates to a laser system utilizing a sorbent-based gas storage and dispensing system for supply of gas to a laser apparatus utilizing same as the excitatory medium for stimulated light emission.

In one aspect the present invention utilizes a system for storage and dispensing of a sorbable fluid as the excitatory gas medium (sometimes hereinafter referred to as "laser gas"). The storage and dispensing system may suitably comprise a storage and dispensing vessel constructed and arranged to hold a solid-phase physical sorbent medium having a sorptive affinity for the sorbable fluid, and for selectively flowing sorbable fluid into and out of such vessel.

A solid-phase physical sorbent medium having a sorptive affinity for the fluid is disposed in the storage and dispensing vessel at an interior gas pressure. The sorbable fluid is physically adsorbed on the sorbent medium.

Means are provided for discharging desorbed fluid from the vessel in the dispensing operation. A dispensing assembly may be coupled in gas flow communication with the storage and dispensing vessel, and constructed and arranged for selective on-demand dispensing of desorbed fluid, after thermal-, concentration differential- and/or pressure differential-mediated desorption of the fluid from the sorbent material. Such dispensing assembly may be constructed and arranged:

(I) to provide, exteriorly of said storage and dispensing vessel, a pressure below said interior pressure, to effect desorption of fluid from the sorbent material, and flow of desorbed fluid from the vessel through the dispensing assembly; and/or (II) to flow thermally desorbed fluid therethrough, and comprising means for heating the sorbent material to effect desorption of the fluid therefrom, so that the desorbed fluid flows from the vessel into the dispensing assembly.

Alternatively, the desorption may be effected by flowing a carrier gas through the vessel to provide a concentration differential that mediates desorption of the fluid from the physical sorbent medium, so that the desorbed fluid is entrained in the carrier gas and discharged from the vessel.

The sorbent medium in the storage and dipsensing system may include any suitable sorbent materials, as for example alumina, silica, aluminosilicates, carbon, macroreticulate polylmers, kieselguhr, etc. Preferred sorbent materials include crystalline aluminosilicate compositions, e.g., with a pore size in the range of from about 4 to about 13 Å, although crystalline aluminosilicate compositions having larger pores, e.g., so-called mesopore compositions with a pore size in the range of from about 20 to about 40 Å, are also potentially usefully employed in the broad practice of the invention.

Examples of such crystalline aluminosilicate compositions include 5A molecular sieve, and preferably a binderless molecular sieve.

Potentially useful carbon sorbent materials include so-called bead activated carbon of highly uniform spherical particle shape, e.g., BAC-MP, BAC-LP, and BAC-G-70R, available from Kreha Corporation of America, New York, N.Y.

The sorbent materials may be suitably processed or treated to ensure that they are devoid of trace components which deleteriously affect the performance of the gas storage and dispensing system. For example, carbon sorbents may be subjected to washing treatment, e.g., with hydrofluoric acid, to render them sufficiently free of trace components such as metals and oxidic transition metal species. Additionally, sorbents such as porous silicon, porous Teflon® or other materials having sorptive affinity for the laser gas, and good desorption characteristics, may advantageously be employed in the broad practice of the invention.

In one aspect, the present invention relates to a laser system including a laser apparatus utilizing laser gas as the excited medium for stimulated emission of the laser output radiation, and a sorbent-based gas storage and dispensing system as the source of the laser gas for the laser apparatus.

In another aspect, the invention relates to an excimer laser system of such type.

A further aspect of the invention relates to a method of generating laser radiation, including the provision of a laser system according to the invention, and selective dispensing of laser gas from the sorbent-based storage and dispensing system to the laser apparatus as the laser gas therefor. The sorbent-based gas storage and dispensing system may be constructed and arranged to provide make-up laser gas on demand to the laser apparatus.

Other aspects and features of the invention will be more fully apparent from the ensuing disclosure and appended claims.

DETAILED DESCRIPTION OF THE INVENTION, AND PREFERRED EMBODIMENTS THEREOF

The disclosures of the following U.S. patents and U.S. patent applications are hereby incorporated herein by reference in their entirety:

U.S. Pat. No. 5,935,305 issued Aug. 10, 1999;

U.S. Pat. No. 5,518,528 issued May 21, 1996;

U.S. Pat. No. 5,704,965 issued Jan. 6, 1998;

U.S. Pat. No. 5,704,967 issued Jan. 6, 1998;

U.S. Pat. No. 5,707,424 issued Jan. 13, 1998;

U.S. Pat. No. 5,761,910 issued Jun. 9, 1998; and

U.S. patent application Ser. No. 09/002,278 filed Dec. 31, 1997.

In the ensuing disclosure, the invention will be described with reference to a gas as the sorbate fluid, however, it will be recognized that the invention is broadly applicable to liquids, gases, vapors, and multiphase fluids, and contemplates storage and dispensing of fluid mixtures as well as single component fluids.

Figure 1:
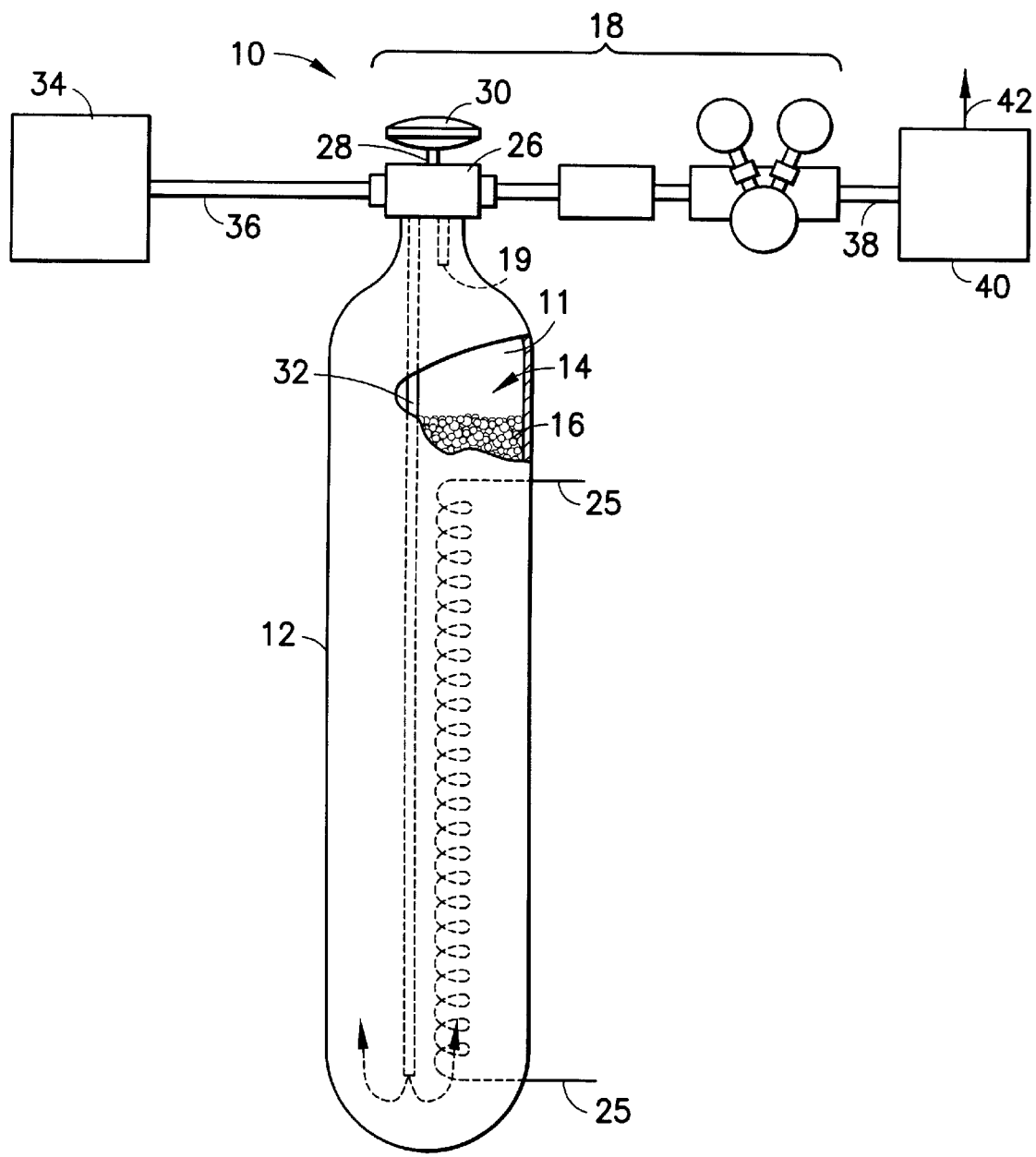
FIG. 1 is a schematic perspective representation of a storage and dispensing vessel and associated flow circuitry according to one embodiment of the invention, which may be usefully employed for the storage and dispensing of fluid in the practice of the present invention.

Referring now to the drawings, FIG. 1 is a schematic representation of a storage and dispensing system 10 comprising storage and dispensing vessel 12 which may be usefully employed for supplying laser gas to a laser apparatus in the broad practice of the present invention. The storage and dispensing vessel may for example comprise a conventional gas cylinder container of elongate character. In the interior volume of such vessel is disposed a bed 14 of a suitable sorbent medium 16 having appropriate sorptive affinity for the laser gas, whereby the laser gas may be readily sorbed on the sorbent medium 16 at appropriate loading, for storage and subsequent dispensing of the laser gas to the laser apparatus.

The vessel 12 is provided at its upper end with a conventional cylinder head fluid dispensing assembly 18 including valve body 26 linked by stem 28 to hand wheel 30, and coupled to port 19. Port 19 allows fluid flow from the interior volume 11 of the cylinder through the valve head into the dispensing assembly 18. To prevent entrainment of particulate solids in the fluid being dispensed from the cylinder, the port 19 may be provided with a frit or other filter means therein.

The cylinder may be provided with various means for discharging desorbed gas from the cylinder, such as the port 19 and dispensing assembly 18 illustratively shown. Such discharge means may include: conduits, pipes, tubes, and channels; flow control means such as flow control valves, pressure-actuated valves, mass flow controllers, and manifolding; motive fluid flow devices such as pumps, blowers, impellers, eductors, ejectors, fans, cryopumps, and vacuum extractors; as well as ports, flow passage openings, etc., as may be desired or appropriate in a given end use application of the present invention.

The vessel 12 may be provided with internal heating means such as heating coil 25 that may be energized by suitable means (not shown), to thermally assist desorption of the sorbate fluid. Preferably, however, the sorbate fluid is at least partially, and most preferably fully, dispensed from the storage and dispensing vessel containing the adsorbed fluid by pressure differential-mediated desorption and/or concentration differential-meidated desorption. Such pressure differential may be established by flow communication between the storage and dispensing vessel, on the one hand, and the exterior dispensing environment or locus of use, on the other. A concentration differential may be created concomitantly by pressure differential, or may be otherwise created by flow of a suitable carrier gas through the vessel e.g., from carrier gas source 34 to carrier gas feed conduit 36, valve head 26 and dip tube 32, to mediate desorption of fluid from the sorbent material. Illustrative of potentially useful carrier gas species are argon, nitrogen, helium, hydrogen, etc.

The sorbent medium 16 may comprise any suitable sorptively effective material, having sorptive affinity for the fluid to be stored and subsequently dispensed from the vessel 12, and from which the sorbate is suitably desorbable. Examples include a crystalline aluminosilicate composition, e.g., a micropore aluminosilicate composition with a pore size in the range of from about 4 to about 13 Å, a mesopore crystalline aluminosilicate composition with a pore size in the range of from about 20 to about 40 Å, a carbon sorbent material such as a bead activated carbon sorbent of highly uniform spherical particle shape, e.g., BAC-MP, BAC-LP, and BAC-G-70R bead carbon materials (Kureha Corporation of America, New York, N.Y.), silica, alumina, macroreticulate polymers, kieselguhr, etc. Other sorbent materials potentially useful in the broad practice of the present invention include porous silicon, porous Teflon®, clays, etc.

The sorbent material may be suitably processed or treated to ensure that it is devoid of trace components which may deleteriously affect the performance of the fluid storage and dispensing system. For example, the sorbent may be subjected to washing treatment, e.g., with hydrofluoric acid, to render it sufficiently free of trace components such as metals and oxidic transition metal species.

The sorbent may be provided in the form of particles, granules, extrudates, powders, cloth, web materials, honeycomb or other monolithic forms, composites, or other suitable conformations of useful sorbent materials, having sorptive affinity for the fluid sought to be stored and subsequently dispensed, and satisfactory desorption characteristics for the dispensing operation.

As mentioned, although it generally is preferred to operate solely by pressure differential and/or concentration differential, in respect of the sorption and desorption of the gas to be subsequently dispensed, the system of the invention may in some instances advantageously employ a heater operatively arranged in relation to the storage and dispensing vessel for selective heating of the solid-phase physical sorbent medium, to effect thermally-enhanced desorption of the sorbed fluid from the solid-phase physical sorbent medium.

The apparatus of the invention optionally may be constructed with a solid-phase physical sorbent medium being present in the storage and dispensing vessel together with a chemisorbent material having a sorptive affinity for contaminants, e.g., decomposition products, of the sorbate fluid therein.

Gas from dispensing assembly 18 is discharged in line 38 to process facility 40 in which the gas is utilized, producing a final waste gas stream discharged from the facility 40 in vent line 42.

Figure 2:
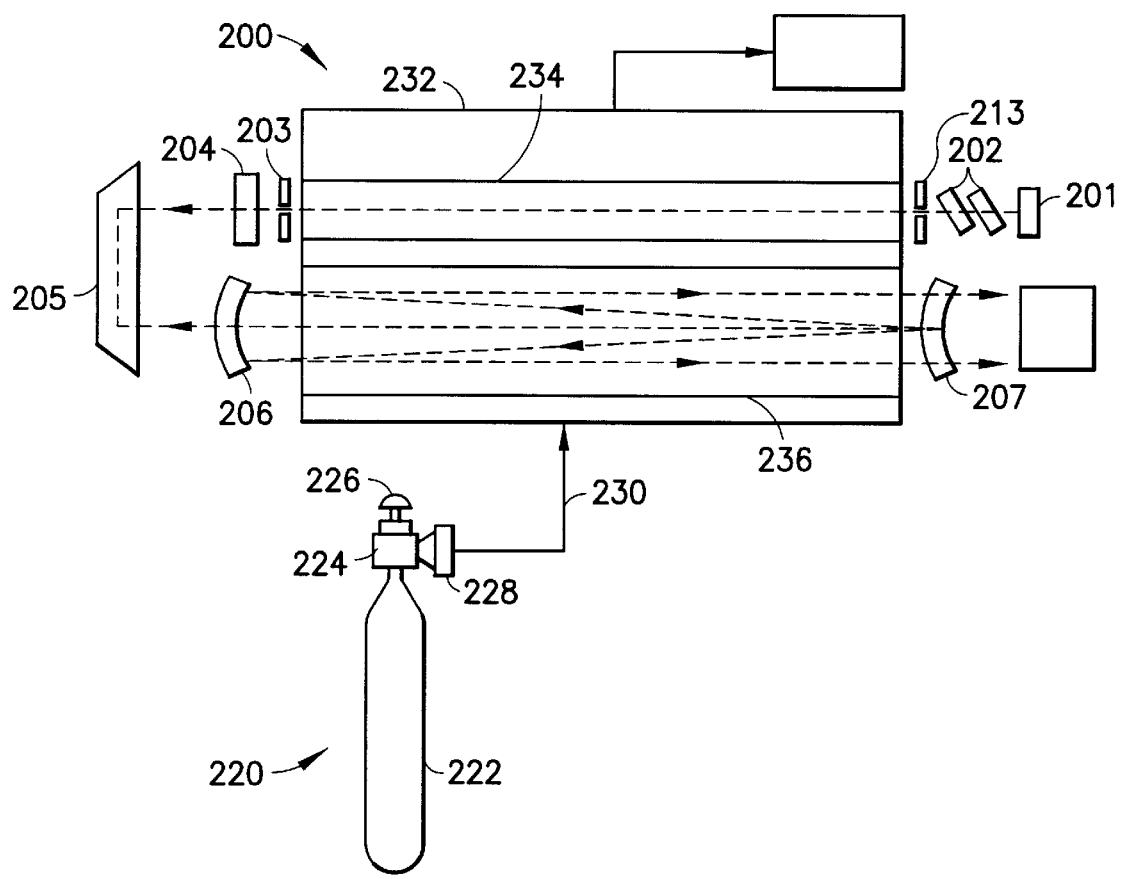
FIG. 2 is a schematic representation of an excimer laser system according to one embodiment of the present invention.

FIG. 2 is a schematic representation of an excimer laser system 200 according to one embodiment of the present invention.

The excimer laser system comprises a laser vessel 232 containing a primary discharge region 234 and a main discharge region 236, as shown, together with a master oscillator rear reflector 201, etalons 202, apertures 203 and 213, master oscillator output coupler 204, prism 205, rear unstable-resonator optic 206 and front unstable-resonator optic 207, arranged and operated in a manner well known to those skilled in the art.

As shown in FIG. 2, the laser vessel 232 is connected by means of laser gas flow line 230 to a gas storage and dispensing system 220 according to the present invention, comprising a storage and dispensing vessel 222 containing a bed of sorbent material having the laser gas sorptively retained thereon. The storage and dispensing vessel 222 is joined at its upper neck region to a valve head 224 including a dispensing handle 226 coupled to an active valve element (not shown) in the valve head 224, and selectively manually or automatically openable to flow laser gas to the discharge coupling 228 of the valve head 224, and into the laser gas flow line 230.

The desorption and dispensing of the laser gas from the storage and dispensing vessel 222 may be carried out by pressure differential, concentration differential and/or thermal desorption techniques, as necessary or desirable in a given end use application of the system schematically shown in FIG. 2.

The laser gas supplied by the gas storage and dispensing system 220 may be of any suitable type appropriate for the generation of laser energy using such gas as the excited medium for stimulated light emission. For example, the laser gas may comprise krypton fluoride, krypton chloride, xenon fluoride, xenon chloride, argon fluoride, argon chloride, fluorine, chlorine, and combinations of two or more of the foregoing.

Figure 3:
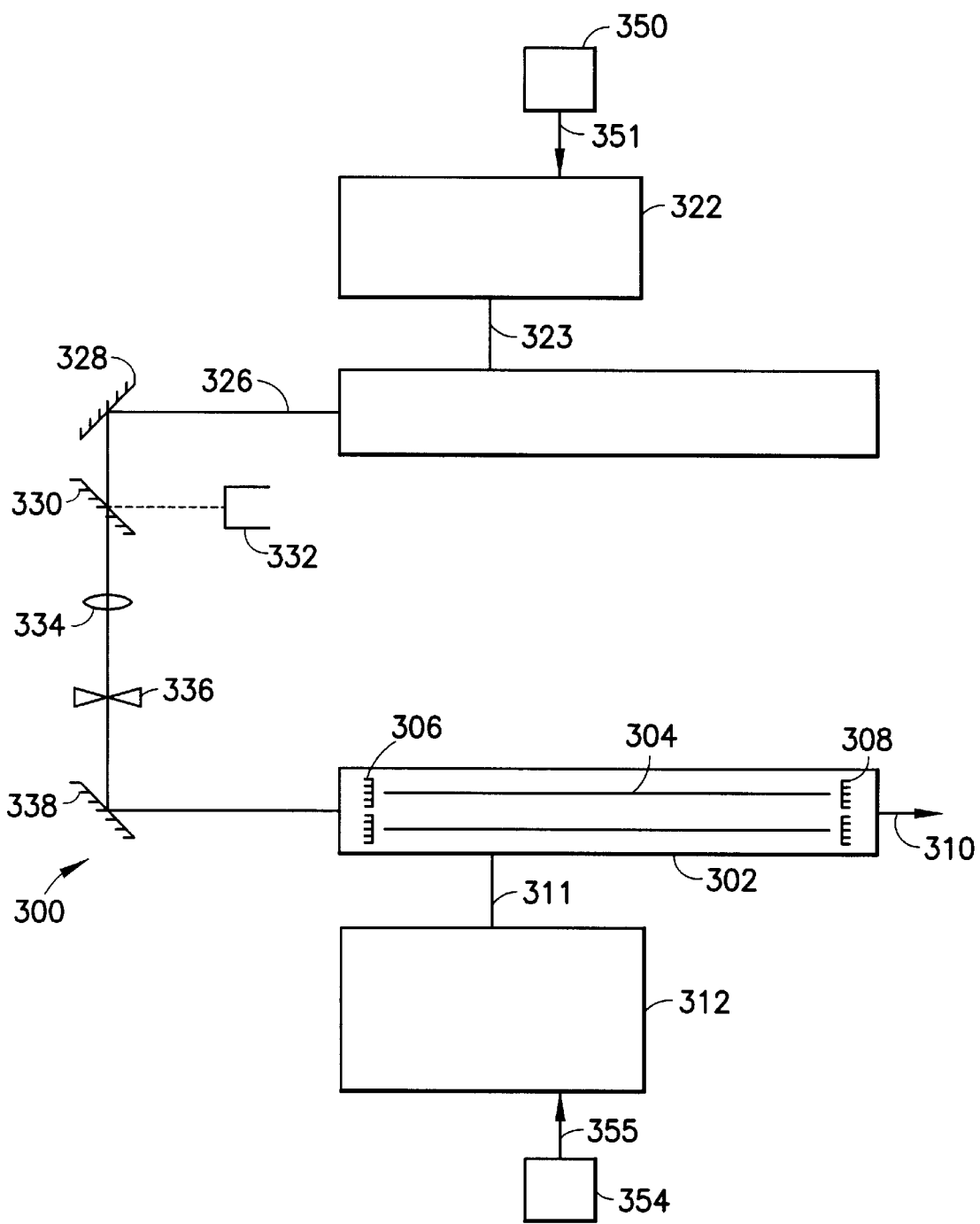
FIG. 3 is a schematic representation of a far infrared gas laser according to another embodiment of the invention.

FIG. 3 is a schematic representation of a far infrared gas laser 300 according to another embodiment of the invention.

The far infrared gas laser 300 comprises a far infrared laser housing 302 containing a waveguide 304. The housing contains a fixed hole input coupler 306 at one end, and a movable hole output coupler of tunable length at the other end. The housing is joined in selectively establishable gas flow communication by means of line 311 with an ultra-high vacuum pump system and low vacuum pump/gas fill system 312. The gas fill system 312 may have joined thereto by gas flow line 355 a gas storage and dispensing system 354 according to the invention, as schematically shown in FIG. 1 hereof, furnishing laser gas to the far infrared laser apparatus. A far-infrared radiation output 310 is produced from the far infrared laser housing 302.

The far infrared laser assembly shown in FIG. 3 further comprises a single-line $CO_2$ laser 320, producing an infrared laser output 326 which passes along the optical circuit including the mirror 328, demountable mirror 330 and power meter 332, the ZnSe lens 334, an optional chopper 336, and mirror 338 to housing 302.

The single-line $CO_2$ laser 320 is joined to a vacuum pump and fill system 322 by line 323, and the vacuum pump and fill system 322 may be supplied with gas from a storage and dispensing system 350 according to the invention, connected thereto by line 323.

The gas storage and dispensing system of the invention may be employed to supply a wide variety of gases in far infrared laser applications, including $CO_2$, $N_2O$, $CD_3OD$, $CH_3OD$, $CH_3OH$, $CH_3NH_2$, $C_2H_2F_2$, HCOOH, $CD_3I$, $CH_3F$, and $C^{13}H_3F$. It will be appreciated that the specific gas employed may be widely varied, depending on the far infrared wavelength lines desired in a given end use application, and that the sorbent and dispensing arrangement may be correspondingly widely varied within the spirit of the present invention.

Applications in which the present invention may be employed, include lasers systems for: materials processing, measurement and inspection, reading, writing, and recording of information, holography, communications, displays, spectroscopy and analytical chemistry, remote sensing, surveying, marking, and alignment, surgical and medical applications, plasma diagnostics, laser weaponry, laser-induced nuclear fusion, isotope enrichment, atomic physics, etc.

Thus, while the invention has been shown and described with reference to specific features, aspects and embodiments herein, it will be appreciated that the invention is susceptible of a wide variety of other embodiments, features and implementations consistent with the disclosure herein, and the invention is therefore to be broadly construed and interpreted, within the spirit and scope of the foregoing disclosure.

What is claimed is:

1. A laser system comprising a laser apparatus utilizing a fluid as an excited medium for stimulated light emission, and a sorbent-based fluid storage and dispensing apparatus comprising a fluid storage and dispensing vessel containing a sorbent medium having sorptive capacity for the fluid, and having fluid adsorbed thereon, wherein the sorbent-based fluid storage and dispensing apparatus is coupled to the laser apparatus in fluid-supplying relationship thereto, and arranged to provide a unidirectional supply of fluid from the fluid storage and dispensing apparatus to the laser apparatus for said stimulated light emission.

2. A laser system according to claim 1, wherein the fluid storage and dispensing apparatus comprises a storage and dispensing vessel constructed and arranged for holding a solid-phase physical sorbent medium having sorptive affinity for said fluid, and means for selectively discharging said fluid from the storage and dispensing vessel for flow to said laser apparatus.

3. A laser system according to claim 2, wherein said means for discharging said fluid from the storage and dispensing vessel include means for effecting desorption of said fluid from the solid-phase physical sorbent medium by one or more of pressure differential, concentration differential, and thermal desorption of said fluid.

4. A laser system according to claim 2, wherein the solid-phase physical sorbent medium comprises a sorbent material selected from the group consisting of silica, alumina, aluminosilicates, kieselguhr, macroreticulate polymers, carbon, clays, and combinations thereof.

5. A laser system according to claim 2, wherein said solid-phase physical sorbent medium comprises an aluminosilicate material.

6. A laser system according to claim 2, wherein said solid-phase physical sorbent medium comprises an activated carbon material.

7. A laser system according to claim 1, wherein said laser apparatus comprises an excimer laser.

8. A laser system according to claim 1, wherein said laser apparatus comprises a far infrared gas laser.

9. A laser system according to claim 1, wherein said fluid comprises a fluid species selected from the group consisting of:

krypton fluoride, krypton chloride, xenon fluoride, xenon chloride, argon fluoride, argon chloride, fluorine, chlorine, $CO_2$, $N_2O$, $CD_3OD$, $CH_3OD$, $CH_3OH$, $CH_3NH_2$, $C_2H_2F_2$, HCOOH, $CD_3I$, $CH_3F$, $C^{13}H_3F$, and combinations thereof.

10. A laser system according to claim 1, wherein said laser apparatus comprises an excimer laser and said fluid comprises a fluid species selected from the group consisting of krypton fluoride, krypton chloride, xenon fluoride, xenon chloride, argon fluoride, argon chloride, fluorine, chlorine, and combinations thereof.

11. A laser system according to claim 1, wherein said laser apparatus comprises a far infrared gas laser and said fluid comprises a fluid species selected from the group consisting of $CO_2$, $N_2O$, $CD_3OD$, $CH_3OD$, $CH_3OH$, $CH_3NH_2$, $C_2H_2F_2$, HCOOH, $CD_3I$, $CH_3F$, $C^{13}H_3F$, and combinations thereof.

12. A method of generating laser energy, comprising operating a laser apparatus utilizing a fluid as an excited medium for stimulated light emission, and supplying said fluid to the laser apparatus from a sorbent-based fluid storage and dispensing system comprising a fluid storage and dispensing vessel containing a sorbent medium having a sorptive affinity for said fluid, and having fluid adsorbed thereon, wherein said supplying of said fluid comprises desorbing said fluid from said sorbent medium and unidirectionally flowing desorbed fluid from said vessel to said laser apparatus, and utilizing same as said excited medium for stimulated light emission.

13. A method according to claim 12, wherein the fluid storage and dispensing system comprises a means for selectively discharging said fluid from the storage and dispensing vessel for flow to said laser apparatus.

14. A method according to claim 13, wherein said means for selectively discharging said fluid from the storage and dispensing vessel include means for effecting desorption of said fluid from the solid-phase physical sorbent medium by one or more of pressure differential, concentration differential, and thermal desorption of said fluid.

15. A method according to claim 12, wherein the solid-phase physical sorbent medium comprises a sorbent material selected from the group consisting of silica, alumina, aluminosilicates, kieselguhr, macroriticulate polymers, carbon, clays, and combinations thereof.

16. A method according to claim 12, wherein said solid-phase physical sorbent medium comprises an aluminosilicate material.

17. A method according to claim 12, wherein said solid-phase physical sorbent medium comprises an activated carbon material.

18. A method according to claim 12, wherein said laser apparatus comprises an excimer laser.

19. A method according to claim 12, wherein said laser apparatus comprises a far infrared gas laser.

20. A method according to claim 12, wherein said fluid comprises a fluid species selected from the group consisting of:

krypton fluoride, krypton chloride, xenon fluoride, xenon chloride, argon fluoride, argon chloride, fluorine, chlorine, $CO_2$, $N_2O$, $CD_3OD$, $CH_3OD$, $CH_3OH$, $CH_3NH_2$, $C_2H_2F_2$, $HCOOH$, $CD_3I$, $CH_3F$, $C^{13}H_3F$, and combinations thereof.

21. A method according to claim 12, wherein said laser apparatus comprises an excimer laser and said fluid comprises a fluid species selected from the group consisting of krypton fluoride, krypton chloride, xenon fluoride, xenon chloride, argon fluoride, argon chloride, fluorine, chlorine, and combinations thereof.

22. A method according to claim 12, wherein said laser apparatus comprises a far infrared gas laser and said fluid comprises a fluid species selected from the group consisting of $CO_2$, $N_2O$, $CD_3OD$, $CH_3OD$, $CH_3OH$, $CH_3NH_2$, $C_2H_2F_2$, $HCOOH$, $CD_3I$, $CH_3F$, $C^{13}H_3F$, and combinations thereof.

* * * * *

UNITED STATES PATENT AND TRADEMARK OFFICE
CERTIFICATE OF CORRECTION

PATENT NO : 6,125,131
DATED : Sep. 26, 2000
INVENTOR(S) : George R. Brandes, Southbury; Glenn M. Tom, Milford; James V. McManus, Danbury, all of Conn.

It is certified that error appears in the above-identified patent and that said Letters Patent are hereby corrected as shown below:

IN THE DRAWING

Fig. 3 The third quadrilateral from the top should be labeled - - 320 - -.

Signed and Sealed this

Eighth Day of May, 2001

*Attest:*

NICHOLAS P. GODICI

*Attesting Officer*     *Acting Director of the United States Patent and Trademark Office*